US008628888B2

(12) United States Patent
Noto

(10) Patent No.: US 8,628,888 B2
(45) Date of Patent: Jan. 14, 2014

(54) FUEL CELL SYSTEM AND CONTROL METHOD FOR FUEL CELL SYSTEM

(75) Inventor: Hironori Noto, Tokai (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/259,895

(22) PCT Filed: Oct. 5, 2010

(86) PCT No.: PCT/IB2010/002510
§ 371 (c)(1),
(2), (4) Date: Sep. 23, 2011

(87) PCT Pub. No.: WO2011/051767
PCT Pub. Date: May 5, 2011

(65) Prior Publication Data
US 2012/0202131 A1 Aug. 9, 2012

(30) Foreign Application Priority Data
Oct. 30, 2009 (JP) ................................ 2009-249926

(51) Int. Cl.
*H01M 8/04* (2006.01)
(52) U.S. Cl.
USPC ............ 429/428; 429/443; 429/444; 429/446
(58) Field of Classification Search
USPC .......................................... 429/429, 446, 444
See application file for complete search history.

(56) References Cited

U.S. PATENT DOCUMENTS

| 5,853,910 A * | 12/1998 | Tomioka et al. ............... 429/415 |
| 2006/0029847 A1 * | 2/2006 | Yumita et al. ................... 429/23 |
| 2006/0210849 A1 * | 9/2006 | Bono .............................. 429/22 |
| 2010/0092819 A1 * | 4/2010 | Umayahara et al. ........... 429/22 |

FOREIGN PATENT DOCUMENTS

| JP | H06-243886 | * | 9/1994 | ............. H01M 8/04 |
| JP | 3022931 B2 | | 1/2000 | |
| JP | 2004-253208 A | | 9/2004 | |
| JP | 2005-134138 A | | 5/2005 | |
| JP | 2006337346 A | | 12/2006 | |
| JP | 2007-095434 | * | 4/2007 | ............. H01M 8/04 |
| JP | 2007-095434 A | | 4/2007 | |

(Continued)

OTHER PUBLICATIONS

International Search Report mailed Jan. 21, 2011 and Written Opinion of PCT/IB2010/002510.

*Primary Examiner* — Patrick Ryan
*Assistant Examiner* — Kiran Quraishi
(74) *Attorney, Agent, or Firm* — Kenyon & Kenyon LLP

(57) ABSTRACT

A fuel cell system includes a fuel cell generating electricity through reaction between fuel and oxidant gases; an air compressor supplying air, as the oxidant gas, to the fuel cell; a shut-off valve interrupting exhaust of air as fuel cell exhaust gas; an air flow meter measuring the flow rate of air supplied to the fuel cell; a pressure sensor measuring a supplied air pressure; and a control unit controlling power generation reaction of the fuel cell, calculating a first calculated air flow rate based on a value measured by the air flow meter and a second calculated air flow rate based on a system volume from the air compressor to the shut-off valve, an air pressure increase in the system volume, calculated based on a value measured by the pressure sensor, and an atmospheric pressure, and calculating a ratio of the second to first calculated air flow rates.

6 Claims, 2 Drawing Sheets

(56) References Cited

FOREIGN PATENT DOCUMENTS

| JP | 2007173074 A | 7/2007 | | |
| JP | 2008-091337 A | 4/2008 | | |
| JP | 2009-277456 | * 11/2009 | ............. | H01M 8/04 |
| JP | 2009277456 A | * 11/2009 | ............. | H01M 8/04 |
| JP | 2010-272467 A | 12/2010 | | |
| WO | 9719329 A1 | 5/1997 | | |
| WO | WO 2008/096801 | * 8/2008 | ............. | H01M 8/04 |

* cited by examiner

FUEL CELL SYSTEM AND CONTROL METHOD FOR FUEL CELL SYSTEM

This is a 371 national phase application of PCT/IB2010/002510 filed Oct. 5, 2010, the contents of which are incorporated herein by reference.

BACKGROUND OF THE INVENTION

1. Field of the Invention

The invention relates to a fuel cell system and a control method for a fuel cell system and, more particularly to a technique for precisely setting the flow rate of air supplied to a fuel cell using a low-cost air flow meter.

2. Description of the Related Art

A fuel cell generally generates electricity by, for example, causing electrochemical reaction between air used as oxidant gas and hydrogen used as fuel gas. However, when the flow rate of air, as oxidant gas, supplied to the cathode of the fuel cell is insufficient, the power generation efficiency decreases. In addition, an electrolyte membrane, which is an important component of the fuel cell, normally has a property that the power generation efficiency increases in a humid state. Therefore, when the flow rate of air supplied is excessively high, the flow of air decreases the humidity of the electrolyte membrane, so the power generation efficiency decreases. For this reason, it is important to measure the flow rate of air supplied to the cathode of the fuel cell with an air flow meter (AFM) and then to control the flow rate so as to constantly become an appropriate state.

Then, development of a vehicle equipped with the fuel cell (fuel cell vehicle) has been pursued. In order to spread the use of the fuel cell vehicle, it is important to reduce the cost of components of the fuel cell system, and the above described air flow meter is also an important element for cost reduction. Japanese Patent Application Publication No. 2004-253208 (JP-A-2004-253208) describes a technique for calculating the air flow rate using a pressure sensor in a fuel cell system. Japanese Patent Application Publication No. 2008-091337 (JP-A-2008-091337) describes a fuel cell system that uses an air flow meter to execute air flow rate feedback control as a function of an actual air flow rate and a required air flow rate.

However, a low-cost air flow meter definitely has a decreased measurement accuracy as compared with an expensive air flow meter. This becomes a bottleneck of high-precision supply flow rate control. In addition, an increase in measurement error due to aged degradation of an air flow meter also becomes a bottleneck of high-precision supply flow rate control.

SUMMARY OF INVENTION

The invention provides a technique that is able to precisely control the flow rate of air supplied to a fuel cell using a low-cost air flow meter in a fuel cell system.

A first aspect of the invention provides a fuel cell system. The fuel cell system includes: a fuel cell that generates electricity by causing reaction between fuel gas and oxidant gas; an air compressor that supplies air, used as the oxidant gas, to the fuel cell; a shut-off valve that interrupts air, which is exhaust gas exhausted from the fuel cell, from being exhausted outside; an air flow meter that measures the flow rate of air supplied to the fuel cell; a pressure sensor that measures a pressure of the supplied air; and a control unit that controls power generation reaction of the fuel cell, wherein the control unit calculates a first calculated air flow rate based on the value measured by the air flow meter, and a second calculated air flow rate based on a system volume from the air compressor to the shut-off valve, a pressure increase of air in the system volume, calculated on the basis of a value measured by the pressure sensor, and an atmospheric pressure, calculates a ratio of the second calculated air flow rate to the first calculated air flow rate. With the above fuel cell system, it is possible to correct an error of the air flow meter and supply air to the fuel cell at an appropriate supply flow rate. In addition, even when an error of a value measured by the air flow meter increases because of aged degradation, it is possible to correct an error of the air flow meter and supply air to the fuel cell at an appropriate supply flow rate. Thus, it is possible to precisely control the flow rate of air supplied to the fuel cell using a low-cost air flow meter.

Another aspect of the invention provides a control method for a fuel cell system. The fuel cell system includes a fuel cell that generates electricity by causing reaction between fuel gas and oxidant gas; an air compressor that supplies air, used as the oxidant gas, to the fuel cell; a shut-off valve that interrupts air, which is exhaust gas exhausted from the fuel cell, from being exhausted outside; an air flow meter that measures the flow rate of air supplied to the fuel cell; and a pressure sensor that measures a pressure of the supplied air. The control method includes: calculating a first calculated air flow rate based on the value measured by the air flow meter; calculating a second calculated air flow rate based on a system volume from the air compressor to the shut-off valve, a pressure increase of air in the system volume, calculated on the basis of a value measured by the pressure sensor, and an atmospheric pressure; calculating a ratio of the second calculated air flow rate to the first calculated air flow. With this control method, it is possible to correct an error of the air flow meter and supply air to the fuel cell at an appropriate supply flow rate. In addition, even when an error of a value measured by the air flow meter increases because of aged degradation, it is possible to correct an error of the air flow meter and supply air to the fuel cell at an appropriate supply flow rate. Thus, it is possible to precisely control the flow rate of air supplied to the fuel cell using a low-cost air flow meter.

Note that the aspects of the invention may be implemented in various forms, and may be, for example, implemented in various forms, such as a method of correcting the flow rate of air supplied to a fuel cell system or a fuel cell in a fuel cell system.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

A. Configuration Outline of Fuel Cell System

Figure 1:
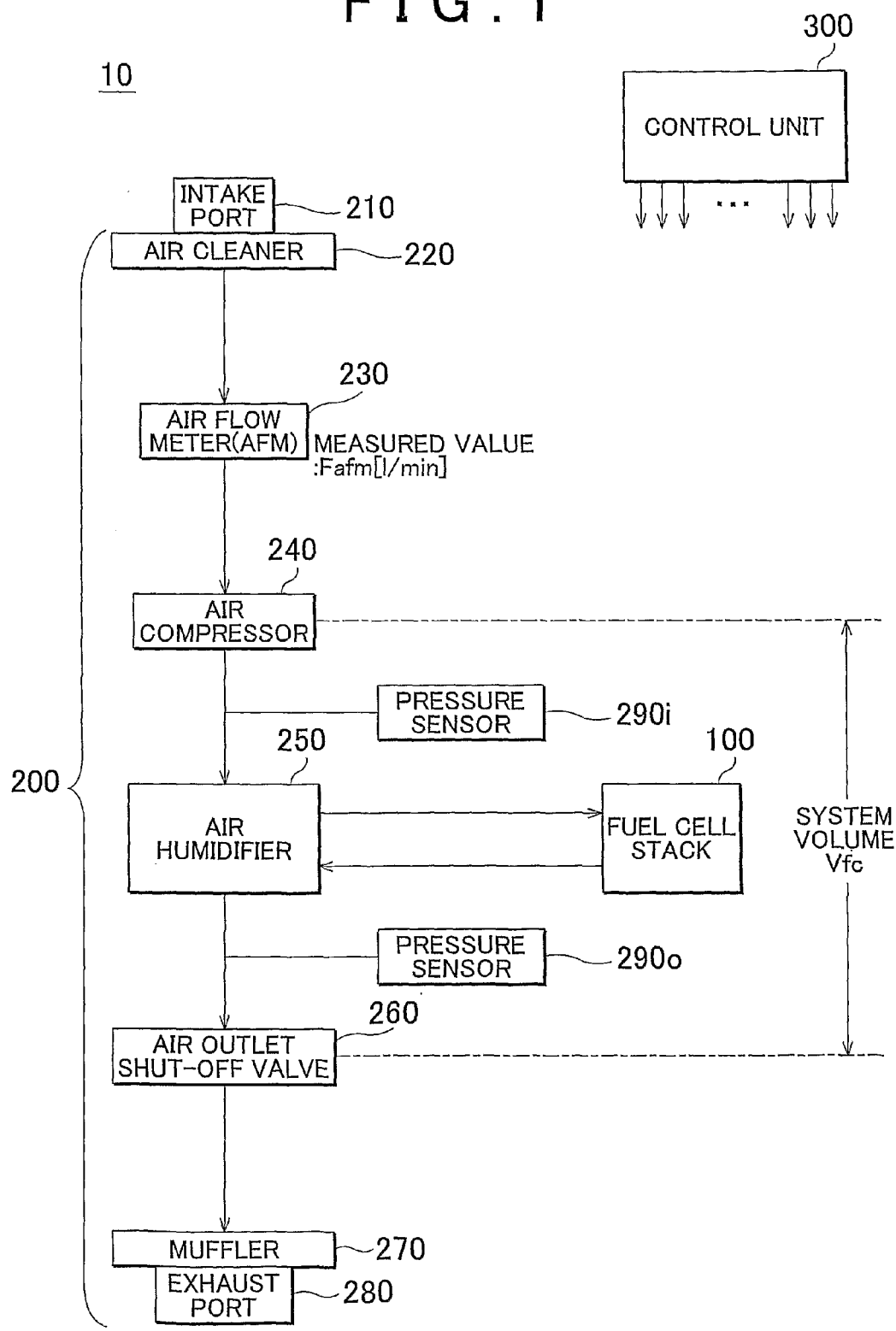
FIG. 1 is a block diagram that shows the schematic configuration of only a supply and exhaust system of air used as oxidant gas in a fuel cell system according to an embodiment.

A fuel cell system 10 shown in FIG. 1 includes a fuel cell stack 100, an air supply and exhaust system 200 and a control unit 300.

The fuel cell stack 100 generates electric power by electrochemical reaction between fuel gas (hydrogen) supplied to an anode (not shown) and air supplied to a cathode (more specifically, oxygen contained in air). The fuel cell stack 100 may be formed of various types of fuel cell, such as a polymer electrolyte fuel cell. Note that, normally, the fuel cell stack 100 has a stack structure in which a plurality of fuel cells are stacked.

The air supply and exhaust system 200 includes an air intake port 210, an air cleaner 220, an air flow meter 230, an air compressor 240, an air humidifier 250, an air outlet shut-off valve 260, a muffler 270 and an exhaust port 280.

By operating the air compressor 240, air is taken in through the intake port 210, and is transferred from the air compressor 240 to the air humidifier 250 through the air cleaner 220 and the air flow meter 230. Air transferred from the air compressor 240 to the air humidifier 250 is humidified and is then transferred to the cathode of the fuel cell stack 100. Air subjected to reaction in the fuel cell stack 100 is exhausted from the fuel cell stack 100 and is transferred to the air humidifier 250 again. Heat of the exhausted air is also utilized to produce water vapor for humidifying air. Then, the exhaust air exhausted from the air humidifier 250 is exhausted from the exhaust port 280 through the muffler 270 as exhaust gas when the air outlet shut-off valve 260 is open. On the other hand, when the air outlet shut-off valve 260 is closed, the exhaust air is not exhausted. As a result, air is supplied from the air compressor 240 to the fuel cell stack 100 only with respect to the system volume of air from the air compressor 240 to the air outlet shut-off valve 260, so the pressure of air in the system volume increases. Note that a pressure sensor 290$i$ is provided in a conduit between the air compressor 240 and the air humidifier 250, and a pressure sensor 290$o$ is provided in a conduit between the air humidifier 250 and the air outlet shut-off valve 260, and an increase in pressure of air in the system volume may be measured by these pressure sensors 290$i$ and 290$o$.

The control unit 300 controls the operations of system components, such as the air compressor 240, the air humidifier 250 and the air outlet shut-off valve 260, on the basis of a value measured by the air flow meter 230, values measured by the pressure sensors 290$i$ and 290$o$, values measured by other various sensors, such as a temperature sensor (not shown) and an atmospheric pressure sensor (not shown), and predetermined various setting conditions to thereby control the operation of the fuel cell system 10. In addition, the control unit may control the air compressor and other system components on the basis of the air flow rate required in response to the operating state of the fuel cell stack, that is, the required air flow rate.

B. Correction of Air Flow Meter

The normal operation of the fuel cell system 10 is the same as that of the existing fuel cell system, so the description thereof is omitted. Hereinafter, correcting an error in a value measured by the air flow meter 230 and controlling the operation of the air compressor 240 so as to attain a desired air flow rate will be described.

Figure 2:
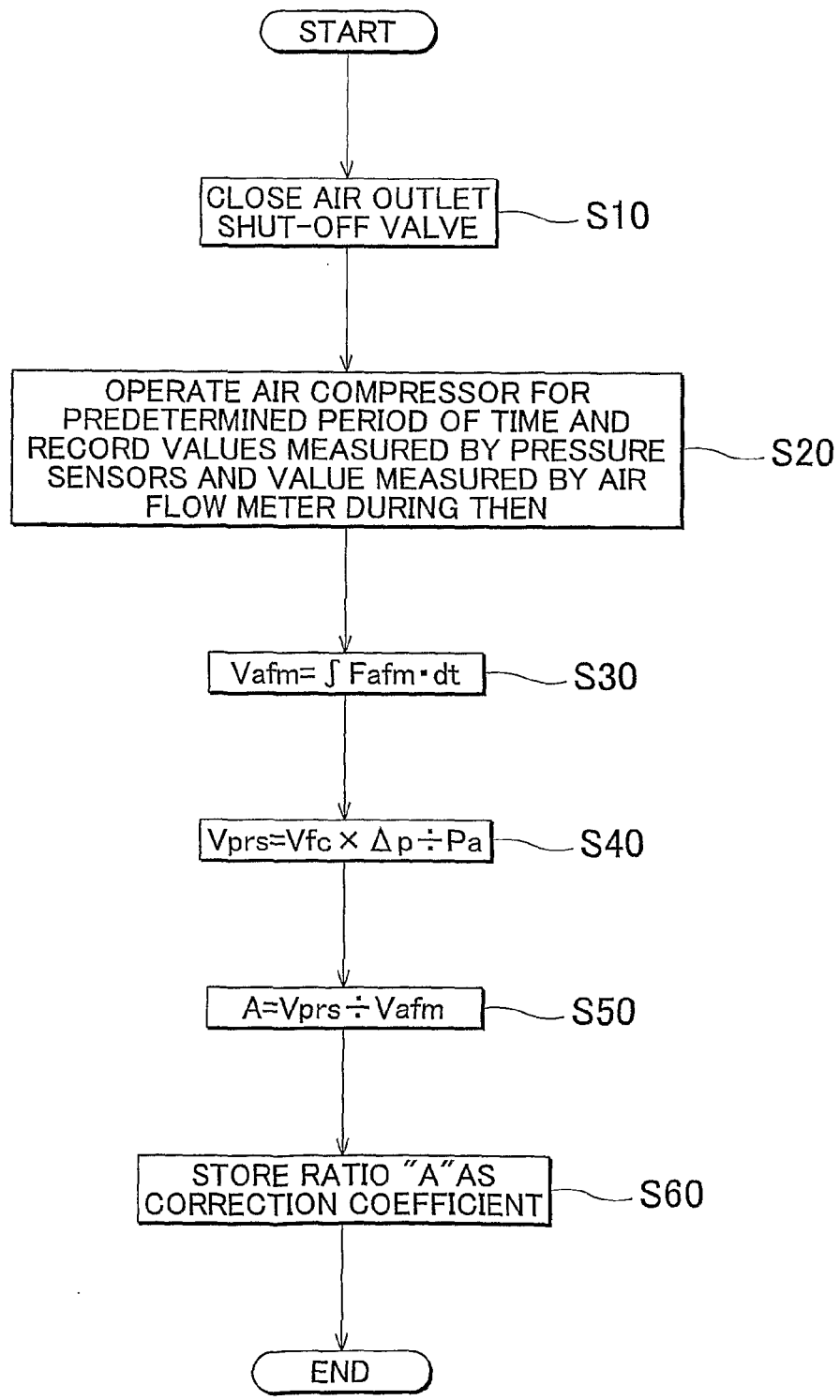
FIG. 2 is a flowchart that shows the procedure of calculating a correction coefficient corresponding to an error of an air flow meter.

FIG. 2 is a flowchart that shows the procedure of calculating a correction coefficient corresponding to an error of the air flow meter 230. Note that this operation may be executed at various timings, such as at the time of start-up of the fuel cell system 10, at the time of periodical inspection and at constant intervals. However, a difference between the temperature of the fuel cell stack 100 and the temperature of the air supply and exhaust system 200 that includes the air flow meter 230 desirably falls within a predetermined range, for example, within a range of about 5° C. This is because, if the temperature of the fuel cell stack 100 is high and has a large difference from the temperature of air that passes through the air flow meter 230, an error occurs in calculating the air flow rate calculated on the basis of an increase in) pressure of the system volume, which will be described later. Thus, at the time of a start of the above operation, it is desirable to confirm that the temperature difference falls within the predetermined range using a temperature sensor. In consideration of this point, it is presumably effective that the above operation is executed at the time of start-up of the fuel cell system.

When the above operation is started, first, the air outlet shut-off valve 260 is closed (step S10). Then, the air compressor 240 is operated during a certain measurement period Ttst, and values measured by the pressure sensors 290$i$ and 290$o$ and the air flow meter 230 are recorded (step S20).

Subsequently, the value Fafm, measured by the air flow meter 230 is integrated by the measurement period Ttst to calculate a measured transfer air amount Vafm based on the values measured by the air supply flow rate (step S30). The measured transfer air amount may be regarded as a first calculated air flow rate according to the aspect of the invention.

$$Vafm = \int Fafm \cdot dt \quad (1)$$

In addition, an estimated supply amount Vprs actually supplied to the system volume is calculated from a pressure increase $\Delta_p a$ during the measurement period (predetermined period) Ttst, the system volume Vfc and an atmospheric pressure Pa (step S40). Note that the system volume Vfc may be easily measured through experiment in advance. Note that the estimated supply amount Vprs may be regarded as a second calculated air flow rate according to the aspect of the invention.

$$Vprs = Vfc \times \Delta p \div Pa(101.4 \text{ kPa}) \quad (2)$$

Then, a ratio A of the estimated supply amount Vprs to the transfer air amount Vafm is calculated (step S50).

$$A = Vprs \div Vafm \quad (3)$$

In this way, the calculated ratio A corresponds to an error of the air flow meter 230, so the ratio A is stored as a correction coefficient (step 60), and then the operation ends.

After that, when the fuel cell system is operated, the stored correction coefficient A is used to control the fuel cell system. That is, it is only necessary that the control unit controls the operation of the air compressor 240 so that the value Fafm measured by the air flow meter 230 becomes a value expressed by the following mathematical expression where the air flow rate required in response to the operating state of the fuel cell stack, that is, the required air flow rate, is F.

$$Fafm = F \div A \quad (4)$$

As described above, a, correction coefficient A corresponding to an error of the air flow meter 230 is calculated at various timings, such as at the time of start-up of the system, and the control unit is able to operate the air compressor 240 so that the value Fafm measured by the air flow meter 230 become a measured value that is obtained by multiplying a desired air supply amount by the correction coefficient A. Here, the desired air supply amount may be the required air flow rate F. For example, from the next control, the control unit is able to control the operation of the air compressor so that an air flow rate calculated by multiplying the value measured by the air flow meter by the correction coefficient is equal to the required air flow rate. By so doing, it is possible to provide a high-performance system that is stable against physical variations, aged degradation, and the like, of the air flow meter 230.

Note that components, other than the components recited in the independent claim, among the components of the above embodiment are additional components and may be appropriately omitted. In addition, the aspect of the invention is not limited to the above embodiment; it may be implemented in various forms without departing from the scope of the invention.

The equation of state of ideal gas expressed by PV=constant is utilized as the mathematical expression (2) used to calculate the estimated supply amount Vprs in the above embodiment; instead, the equation of real gas expressed by $(P+a/V^2)(V-b)$=constant (van der Waals equation of state) may be utilized instead.

The invention claimed is:

1. A fuel cell system comprising:
   a fuel cell that generates electricity by causing reaction between fuel gas and oxidant gas;
   an air compressor that supplies air, used as the oxidant gas, to the fuel cell;
   a shut-off valve that interrupts air, which is exhaust gas exhausted from the fuel cell, from being exhausted outside;
   an air flow meter that measures the flow rate of air supplied to the fuel cell;
   a pressure sensor that measures at least a pressure of the supplied air; and
   a control unit programmed to control power generation reaction of the fuel cell, the control unit being programmed i) to operate the air compressor for a predetermined period of time in a state where the shut-off valve is closed, and to record a value measured by the air flow meter and a value measured by the pressure sensor during then, ii) to calculate:
      a first calculated air flow rate based on the value measured by the air flow meter by integrating the value measured by the air flow meter by the predetermined period of time, iii) to calculate
      a second calculated air flow rate based on a system volume from the air compressor to the shut-off valve, a pressure increase of air in the system volume, calculated on the basis of the value measured by the pressure sensor, and an atmospheric pressure, and then iv) to calculate a ratio of the second calculated air flow rate to the first calculated air flow rate.

2. The fuel cell system according to claim 1, wherein the control unit is programmed to calculate the ratio of the second calculated air flow rate to the first calculated air flow rate to thereby calculate a correction coefficient corresponding to an error of the value measured by the flow meter, and then controls operation of the air compressor so that an air flow rate calculated by multiplying the value measured by the air flow meter by the correction coefficient becomes a desired air flow rate.

3. A control method for a fuel cell system that includes a fuel cell that generates electricity by causing reaction between fuel gas and oxidant gas; an air compressor that supplies air, used as the oxidant gas, to the fuel cell; a shut-off valve that interrupts air, which is exhaust gas exhausted from the fuel cell, from being exhausted outside; an air flow meter that measures the flow rate of air supplied to the fuel cell; and a pressure sensor that measures a pressure of the supplied air, the control method comprising:
   operating the air compressor for a predetermined period of time in a state where the shut-off valve is closed, and recording a value measured by the air flow meter and a value measured by the pressure sensor during then;
   calculating a first calculated air flow rate based on the value measured by the air flow meter by integrating the value measured by the air flow meter by the predetermined period of time;
   calculating a second calculated air flow rate based on a system volume from the air compressor to the shut-off valve, a pressure increase of air in the system volume, calculated on the basis of the value measured by the pressure sensor, and an atmospheric pressure; and
   calculating a ratio of the second calculated air flow rate to the first calculated air flow rate.

4. The control method for a fuel cell system according to claim 3, further comprising:
   calculating the ratio of the second calculated air flow rate to the first calculated air flow rate to thereby calculate a correction coefficient corresponding to an error of the value measured by the air flow meter; and
   controlling operation of the air compressor so that an air flow rate calculated by multiplying the value measured by the air flow meter by the correction coefficient becomes a desired air flow rate.

5. The control method for a fuel cell system according to claim 3, wherein the control method is executed at the time of start-up of the fuel cell system.

6. The control method for a fuel cell system according to claim 3, wherein the control method is executed when a difference in temperature between the fuel cell and an air supply and exhaust system is lower than or equal to 5° C.

* * * * *

UNITED STATES PATENT AND TRADEMARK OFFICE
CERTIFICATE OF CORRECTION

PATENT NO.       : 8,628,888 B2
APPLICATION NO.  : 13/259895
DATED            : January 14, 2014
INVENTOR(S)      : H. Noto It is certified that error appears in the above-identified patent and that said Letters Patent is hereby corrected as shown below:

In the Specification:

At column 4, line 16, change "Fain," to -- Fafm --.

At column 4, line 26, change "Δpa" to -- Δ$p$ --.

At column 4, line 53, change "above, a, correction" to -- above, a correction --.

Signed and Sealed this
First Day of July, 2014

Michelle K. Lee
*Deputy Director of the United States Patent and Trademark Office*